Figure 1:
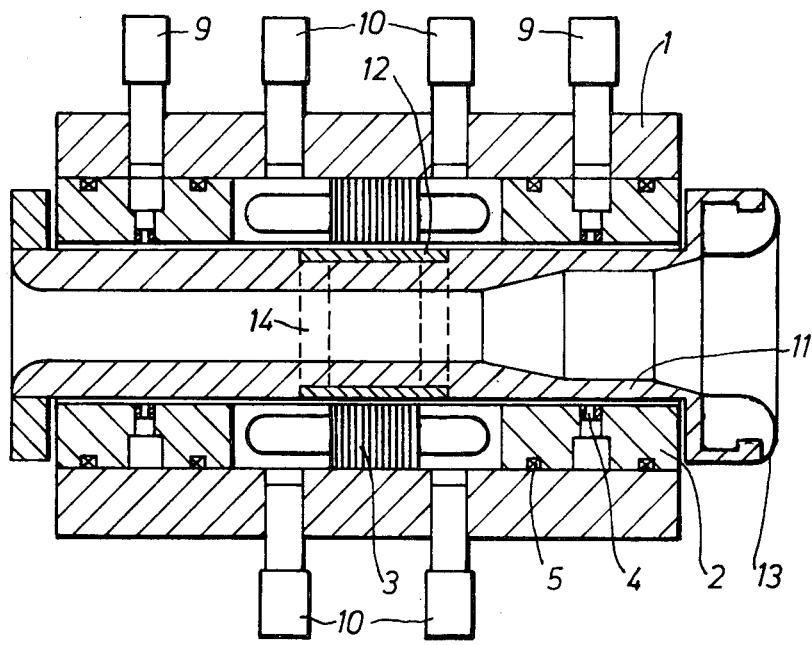

United States Patent [19]

Muschelknautz et al.

[11] 4,055,940
[45] Nov. 1, 1977

[54] INTERNAL FRICTION TWIST DEVICE

[75] Inventors: Edgar Muschelknautz, Leverkusen; Franz Nemecek, Duesseldorf, both of Germany

[73] Assignee: Bayer Aktiengesellschaft, Leverkusen, Germany

[21] Appl. No.: 696,300

[22] Filed: June 15, 1976

[30] Foreign Application Priority Data

June 18, 1975 Germany .............................. 2527004

[51] Int. Cl.² ........................................... D01H 7/92
[52] U.S. Cl. .................................. 57/77.4; 57/77.45
[58] Field of Search .................. 57/34 R, 77.3–77.45, 57/100

[56] References Cited

U.S. PATENT DOCUMENTS

| 2,863,277 | 12/1958 | Boillat et al. | 57/77.45 X |
| 3,241,304 | 3/1966 | Mattingly et al. | 57/77.45 X |
| 3,537,250 | 11/1970 | MacKintosh | 57/77.4 |
| 3,656,290 | 4/1972 | Kuussaari | 57/77.45 X |

FOREIGN PATENT DOCUMENTS 161,887  4/1954  Australia ............................. 57/77.3

Primary Examiner—Donald Watkins
Attorney, Agent, or Firm—Plumley and Tyner

[57] ABSTRACT

The invention relates to an internal friction twist device for texturing fine threads comprising an air-supported twist device in the form of a component of the rotor of an electric motor.

12 Claims, 12 Drawing Figures

INTERNAL FRICTION TWIST DEVICE

The invention relates to an internal friction twist device for texturing fine threads.

Internal friction twist devices are used in the man-made fibre industry for texturing synthetic threads of fine and average titre. An object of the present invention is to develop new twist devices which are suitable for substantially higher thread speeds than those which are generally used at the present time, which effect a lower increase of thread tension and which in addition should work as noiselessly as possible.

The internal friction twist devices used until now for texturing synthetic threads consist essentially of a tube with rounded feed and delivery mouthpieces. The tube runs on a ball-bearings and is driven by a belt.

There are also twist devices which have only one feed mouthpiece. In addition, combinations of successively arranged twist devices of this type are known, in which the mouthpieces are arranged successively in a defined sequence. The feed and delivery angles of the threads relative to these twist devices and mouthpieces can be varied.

When they were introduced, these twist devices constituted a great step forward in comparison with spindle units, because the running speed of the threads was able to be substantially raised and the increase of the thread tension in the twist device could be reduced. The disadvantage is that, with these internal friction twist devices, basically only threads of fine titre can be textured, because the torque transfer is limited. In order to be able to transfer the highest possible torque to the threads, the feed and delivery mouthpieces are produced from materials having a high coefficient of friction, and these mouthpieces can generally be exchanged and replaced by new replacement mouthpieces or mouthpieces reworked at the rubbing surface.

The high speeds of rotation of the twist device of up to about 20,000 rpm which are necessary for the high thread speeds are also disadvantageous. At these rotational speeds, expensive precision-made ball bearings with oil spray lubrication must be used and allowance must be made for considerable noise from the ball bearings and self drive system. The twist devices are generally mounted in so-called twist device boxes of large dimensions. As a result of the high rotational speed, mechanical faults frequently occur and the belt drive is complicated and expensive.

The twist devices are generally fitted horizontally and at right angles or parallel to the rest of the machine, so that angle variation of the threads during feed and delivery are only possible by using thread guides. This results in a further disadvantage of the conventional internal friction twist device.

It has now been found that, in comparison with the twist devices previously used, the thread running speed, the thread tension increase and the uniformity of texturing can be substantially improved if, according to the invention, internal friction twist devices are provided with air-bearings and direct electrical drive by combining the revolving tube with the cage of a squirrel cage rotor and forming the housing in this region as the corresponding stator.

Air bearings and asynchronous motors having hollow rotors are known in themselves. However, it was not to be expected that, with the required small dimensions of rotor and stator and the necessary high rotational speed of at least 20,000 rpm, it would be possible to achieve sufficient load capacity and stability with static or dynamic air bearings despite the inevitable imbalances of the exchangeable mouth pieces and despite the wear of these mouthpieces which occurs in operation. In addition, it was necessary to assume that the air gap of the air bearing also determines and influences the air gap of the electric motor. Because the air gaps of air bearings are non-uniform according to the load and can even vary considerably during operation, it was necessary to take into consideration the fact that as a result the air gap of the motor and the motor itself would be unfavourably influenced, which appeared very disadvantageous particularly at the desired high frequencies of at least 200 to 600 Hz and the required electrical power of 50 to 500 W.

Furthermore, it was very uncertain whether it would be possible to make the cage of the rotor element in the form of the cages of squirrel cage rotors with the appropriate strength, homogeneity and precision, and, considering the small dimensions involved and the high rotational speeds, whether it would be possible to achieve a sufficiently high degree of efficiency as is necessary in order to achieve the lowest possible heating of the motor.

Despite a great deal of doubt, it has surprisingly been proved that stable air bearings can be constructed both statically and dynamically and also that the direct electric motor drive permits the required output of up to 75,000 rpm with an efficiency of up to 0.5 if, according to the invention, an air bearing ring is provided in a housing on either side, and if between and isolated from these rings the stator element of a squirrel cage rotor is also used as a ring.

An object of the invention, therefore, is an internal friction twist device for texturing fine threads, comprising an air-supported twist device in the form of a component of the rotor of an electric motor.

The tube shaped twisting device in the form of the rotor of an electric motor lies with two support surfaces for radial and axial guiding in two air-bearing rings. Between the air-bearing rings there is located the stator element, which is also ring shaped, of a squirrel cage rotor drive. The air bearings can be constructed as static, dynamic or combined bearings. In this arrangement the dynamic or combined bearings are optionally designed as orifice bearings. Bores lead through the dynamic or combined bearing rings in radial direction, and these serve to supply compressed air or other suitable fluid. In the case of the orifice bearings these bores are located where maximum pressures occur.

Very good results are obtained for load capacity, stability and motor efficiency if the ratio of the length parallel with the axis to the internal diameter is approximately 1, both for the air bearings and for the stator, and if air gaps of from 15 to 35 $\mu$ are maintained. In the region of the air gaps, the diameter of the air inlet bores should be from 0.15 to 0.35 mm.

The electrical drive of the twist device takes place according to the principle of an asynchronous motor with a squirrel cage rotor and is provided with a frequency control device. A portion of the tube of the cylindrical twist device, namely the part which runs in the region of the stator, is in the form of an actual rotor of the electrical drive system. For this purpose, two radially extending grooves are cut into the outer surface of the cylindrical twist device tube, and these grooves are connected by at least two axially extending grooves.

The grooves are filled with an electrically conductive material, preferably copper. This groove system, filled for example with copper, serves as the cage or squirrel cage rotor of the electrical drive system.

It is particularly advantageous if, according to the invention, the cage of the squirrel cage rotor is manufactured from copper according to the plasma spraying method and the whole surface is coated with a 0.1 mm thick layer of chromium. In addition, the bearing bushes are advantageously made of brass while the rotor is manufactured from a carbon steel. To stabilise the rotor in the axial direction, washers of approximately 40 mm outside diameter should be provided on either side of the rotor.

The individually driven twist devices designed and constructed in this way according to the invention offer the great advantage that their working position on the texturing machine can be selected spatially at will in the range of up to 30° from the conventional position of the internal friction twist devices known hitherto.

In a further embodiment of the invention, for special applications in the case of fine titres, an internal friction twist device has been developed with air bearings and direct electrical drive, in which the air bearing member is combined with the motor part in such a way that an annular twist device is produced having only one air bearing, which can be arranged in any position. This confers the very great advantage of being able to select almost any thread path angle with very small masses of the rotating parts. It permits low production costs and provides the possibility of arranging a plurality of such annular twist devices successively as a unit in such a way that the whole twist device can be closed like a hinge at the start and the threads can simply be pushed through the rings positioned almost on top of one another, and during running the hinge can be opened and in this way the desired deviations and angles can be achieved immediately. With these annular twist devices, vertical arrangements are also possible with thread loops of up to 540° and, if auxiliary thread guides are used, still greater loops are possible.

The annular twist device, similarly to the tube-like twist device already described, comprises a rotor element supported radially and axially on air bearings and a stator element. The rotor, which assumes the function of the internal friction twist device, i.e. which transfers a torque to the yarn material to be textured, is in this case in the form of a ring of aluminum or other suitable material, which simultaneously contains the rotor lamination bundle of the electrical drive, and a groove is cut in the outside of the ring to receive the stator, as can be seen from FIGS. 3 and 4. The annular stator consists essentially of a stator lamination bundle and the conventional winding, which are cast in a plastic or other suitable material to form a stator unit. In addition, it contains bores and nozzles for the compressed air supply, which are in communication with an annular outwardly sealed channel for the distribution of the compressed air.

Figure 5:
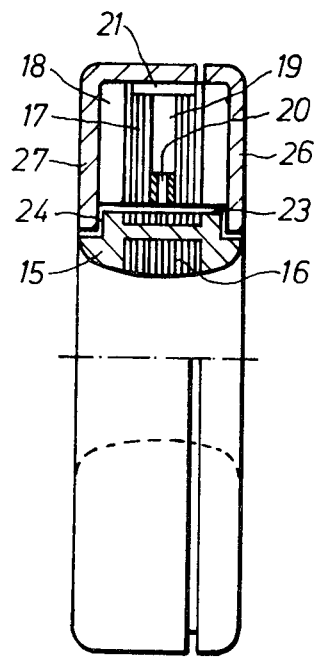

In another embodiment of the device according to the invention, the stator is cast, in a suitable casting material with the stator lamination bundle and the winding with an outer covering to form a housing, in which the rotor is supported in the manner shown in FIG. 5.

To stabilise the thread, according to the invention, a pin can be secured on the periphery of the twist device with a guide roller preferably supported by compressed air.

In order to be able to transmit high torque values to the thread, the revolving ring is correspondingly coated, preferably with sintered oxides or with elastic coatings based on polyurethane dispersions.

The internal friction devices according to the invention are illustrated and explained with reference to FIGS. 1 to 12.

FIG. 1 shows a section in the axial direction through an internal friction twist device with air bearings and the electrical element.

In FIG. 1, the numeral 1 represents the housing of the internal friction twist device, in which the two air bearings bushes 2 and the stator of the electrical drive 3 are mounted. The bearing bushes are sealed with the sealing rings 5. The compressed air is supplied via the compressed air nipple 9 and nozzles 4. The inlet 10 serves to supply a coolant for the stator. 11 represents the body of the twist device rotor, in which a cage 12 of an asynchronous motor is arranged and which is provided with a friction mouthpiece 13.

Figure 2:
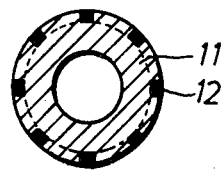

FIG. 2 shows a corss-section through the cage element of the rotor of the twist device rotor. 12 designates the cage (squirrel cage rotor) of the twist device rotor designed as a squirrel cage rotor, i.e. the grooves running in an axial direction in cross-section and filled with an electrically conductive material. These are connected by the grooves running in the radial direction (see FIGS. 1 and 14) and similarly filled, thus forming the cage.

Figure 3:
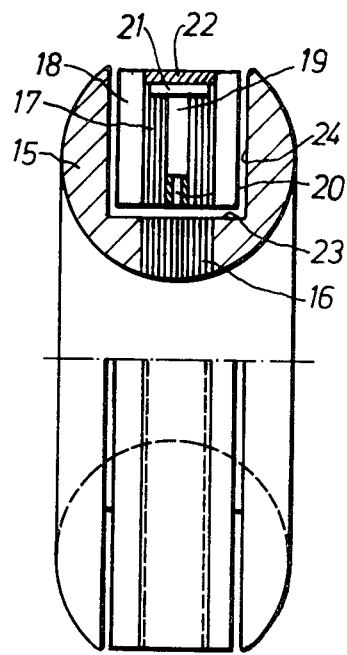

FIG. 3 shows an internal friction twist device of the ring type with the relevant air bearing and the electrical drive in cross-section. 15 represents the body of the twist device rotor. 16 is the lamination bundle (laminated iron core) of the rotor. 17 represents the lamination bundle of the stator with the winding 18. 19 and 20 designate the bore and nozzle for the compressed air supply. 21 is a channel for compressed air distribution, which is sealed with the ring 22. 23 and 24 represent the support surfaces of the air bearing in the radial and axial direction.

Figure 4:
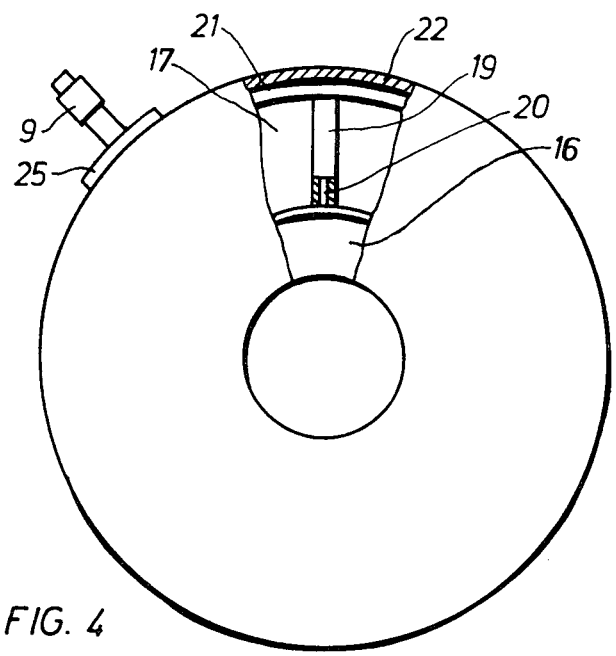

FIG. 4 shows a side view of the twist device shown in FIG. 3. 9, as in FIG. 1, is a compressed air nipple on a mounting plate 25. The rest of the elements in FIG. 4 have the same meaning as in FIG. 3.

FIG. 5 shows in cross-section another embodiment of the internal friction twist device with air bearings and electrical drive. 15 is the rotor of the twist device with the cast integral rotor lamination bundle 16, 17 is the stator lamination bundle, 18 is the winding of the electrical drive, 27 is the body of the stator, 26 is the top of the stator and 20 is the compressed air supply nozzle. Otherwise the numerals correspond to those in FIG. 3.

Figure 6:
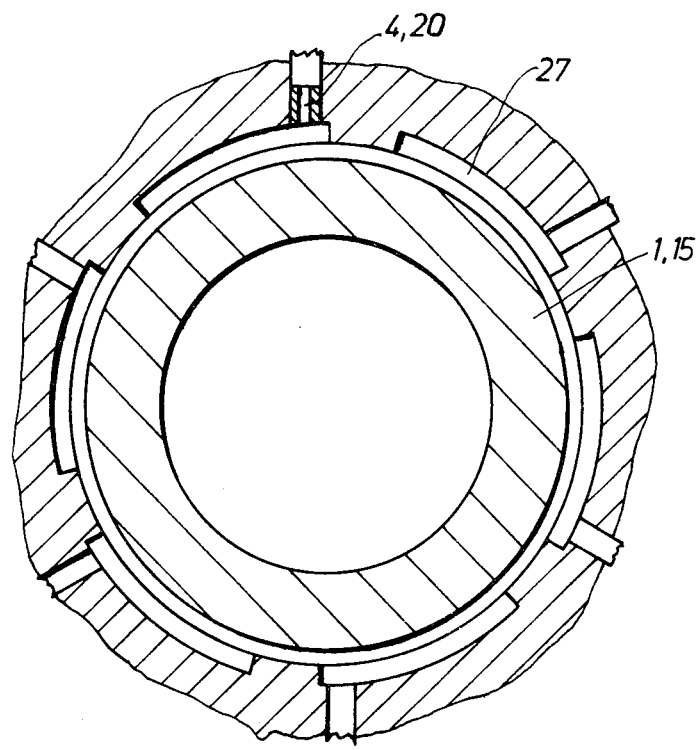
Figure 7:
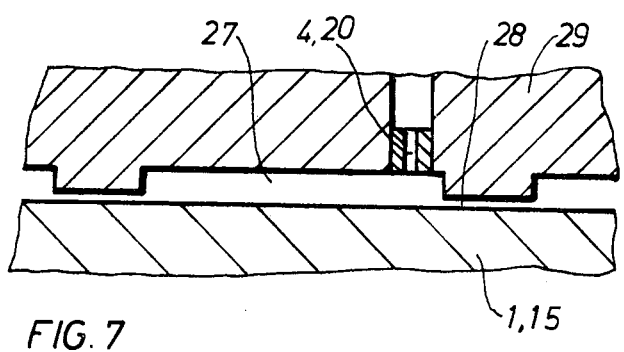

FIGS. 6 and 7 show a special embodiment of the air bearing. This can relate to the simple internal friction twist device with divided air bearings and electrical drive, or to a twist device of the annular type according to FIGS. 3, 4 and 5.

In FIG. 6, the numeral 1 (15) represents the rotor of a dynamic bearing in the form of an orifice bearing, 4 (20) is the compressed air supply nozzle and 27 is the depression in the body of the air bearing bush. In FIG. 7, 1 (15) represents the rotor, 29 is the bush and 4 (20) is the nozzle of the orifice bearing. 27 represents the depression and 28 the orifice of this bearing.

Figure 8:
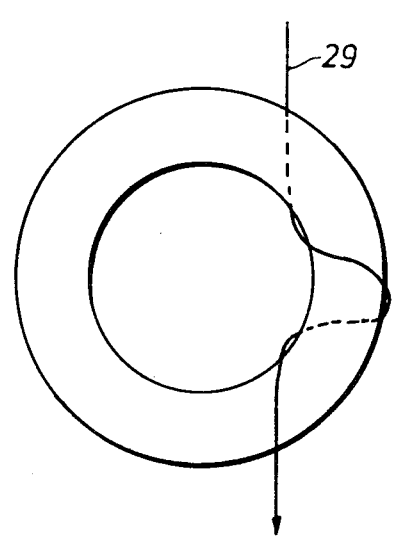
Figure 9:
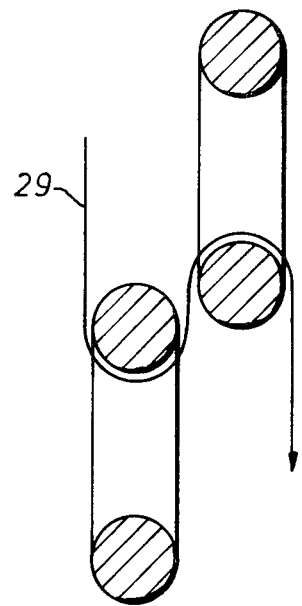
Figure 10:
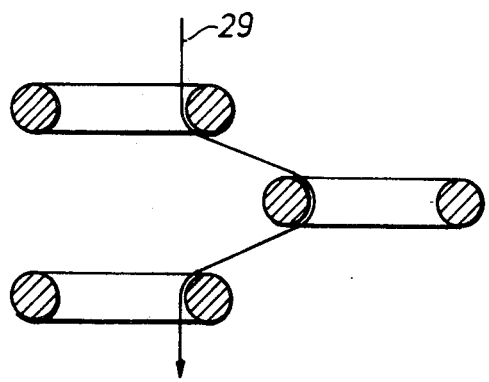
Figure 11:
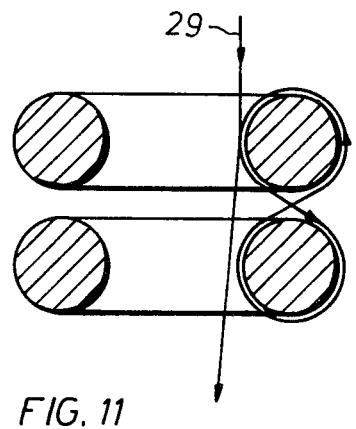

FIG. 8 shows the method of working of a twist device of the annular type, FIG. 9 shows the horizontal arrangement and functioning of two such twist devices, FIG. 10 shows the vertical arrangement and functioning of three annular twist devices and FIG. 11 shows another application of two such twist devices in the vertical position. 29 is in each case the thread to be textured.

Figure 12:
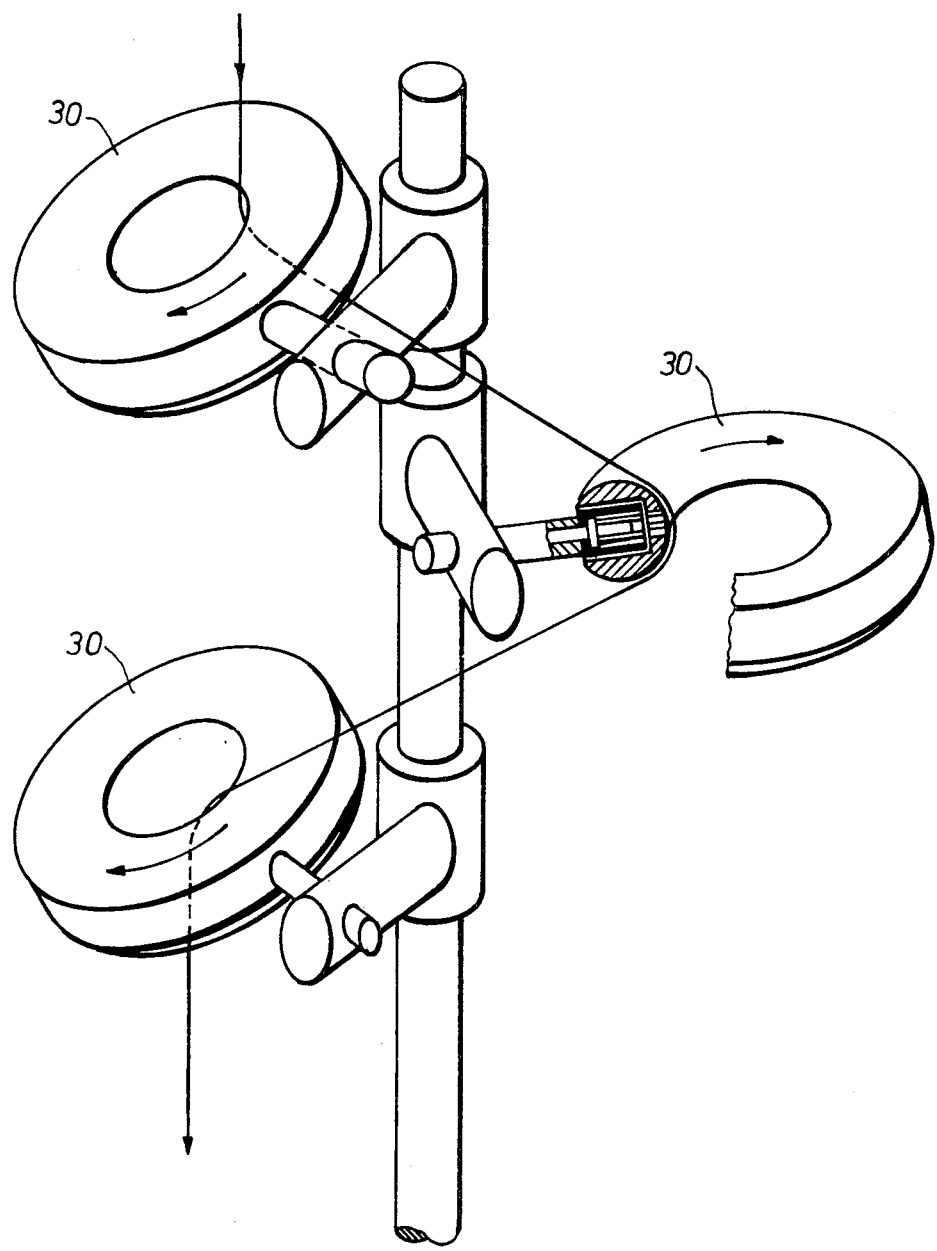

FIG. 12 shows a plurality of twist devices (30) of the annular type fitted to a support and connected to one another to form a unit. The twist devices are adjustable both in height, in the direction of the axis of the support, and also pivotally in a plane at right angles to the axis of the support, in each case about 360°. In addition, with these planes, the twist devices can form any angle.

We claim:

1. An internal friction twist device for texturing fine threads, comprising an air-supported twist device in the form of a component of the rotor of an electric motor.

2. An internal friction twist device according to claim 1, wherein the twist device is tube-shaped and is supported with two bearing surfaces for radial and axial guidance in a housing with air bearing rings, between which is arranged the annular stator element of a squirrel cage rotor.

3. An internal friction twist device according to claim 2 wherein the air bearings are in a form selected from the group consisting of static, dynamic and combined bearings and wherein dynamic and combined bearings are designed as orifice bearings.

4. An internal friction twist device according to claim 3, wherein, in the case of dynamic and combined bearings, the air bearing rings are provided with radial air inlet bores.

5. An internal friction twist device according to claim 4, wherein the air bearings have bearing bushes manufactured from brass and a rotor manufactured from a material selected from the group consisting of steel and aluminum, the ratio of the length of the bearings parallel with the axis to the internal diameter is substantially 1:1, the air gap has a width of from 15 to 24 μm, the air inlet bores have diameters of from 0.15 to 0.35 mm and, in the case of the orifice bearing, the air inlet bores are provided at points of maximum pressure.

6. An internal friction twist device according to claim 1, having a drive system in the form of an asynchronous motor with a squirrel cage rotor having frequency control.

7. An internal friction twist device according to claim 6, wherein the rotor element of an electric drive is recessed into the outer surface of the twist device tube, in the form of two radially extending grooves filled with an electrically conductive material, which are connected by at least two similarly filled axially extending grooves, thereby forming the cage of a squirrel cage rotor as the electric drive system.

8. An internal friction twist device according to claim 7, wherein the surface of the twist device tube is coated, in particular in the region of the electrical drive system, with a layer of chromium substantially 0.1 mm thick.

9. An internal friction twist device according to claim 1 wherein the twist device is in the form of a ring which moves as the rotor of an electric motor in an annular stator in a single air bearing.

10. An internal friction twist device according to claim 9, having drive means in the form of an asynchronous motor with a squirrel cage rotor having frequency control.

11. An internal friction twist device according to claim 10, wherein the drive means are effected with direct current and by a disc rotor motor.

12. An internal friction twist device according to claim 9, wherein the stator has a winding and lamination bundle the stator cast integrally in a plastics material or similar substance suitable for this purpose, and simultaneously form a rigid bush for the air bearing support, the lamination bundle of the stator being provided with a circumferentially extending channel and a plurality of bores with air nozzles for compressed air distribution, and the twist device at the same time being in the form of a squirrel cage rotor of the electrical drive system in which the lamination bundle is cast.

* * * * *